United States Patent [19]

Cohen

[11] 4,140,671
[45] Feb. 20, 1979

[54] WARP-RESISTANT FLAME-RETARDED REINFORCED THERMOPLASTIC COMPOSITIONS

[75] Inventor: Stuart C. Cohen, Evansville, Ind.

[73] Assignee: General Electric Company, Pittsfield, Mass.

[21] Appl. No.: 866,058

[22] Filed: Dec. 30, 1977

[51] Int. Cl.$^2$ .......................... C08K 3/34; C08K 7/14
[52] U.S. Cl. .................. 260/40 R; 260/37 R; 260/860
[58] Field of Search ............ 260/40 R, 860, 37 R

[56] References Cited

U.S. PATENT DOCUMENTS

| | | | |
|---|---|---|---|
| 3,742,087 | 6/1973 | Nield | 260/860 |
| 3,915,926 | 10/1975 | Wambach | 260/40 R |
| 4,021,596 | 5/1977 | Bailey | 260/860 X |
| 4,035,333 | 7/1977 | Kamoda et al. | 260/40 R |
| 4,046,836 | 9/1977 | Adelmann et al. | 260/860 |

*Primary Examiner*—Sandra M. Person
*Attorney, Agent, or Firm*—Morgan, Finnegan, Pine, Foley & Lee

[57] ABSTRACT

Flame-retarded reinforced thermoplastic compositions are provided comprising a high molecular weight linear polyester resin, a warp resisting amount of a polyphenylene sulfide powder, a flame-retardant and reinforcing fillers. The compositions are moldable to articles having improved resistance to warpage. When the polyphenylene sulfide is employed in the compositions which contain decabromodiphenyl ether as the flame retardant, unexpected improvement in high arc resistance is also observed.

10 Claims, No Drawings

WARP-RESISTANT FLAME-RETARDED REINFORCED THERMOPLASTIC COMPOSITIONS

This invention relates to the flame-retarded reinforced molding compositions which have improved resistance to warpage in the molded article. More particularly, it pertains to compositions comprising a high molecular weight linear polyester resin, such as, a poly (1,4-butylene terephthalate) resin, and a warp resisting amount of polyphenylene sulfide powder.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has been previously disclosed in co-pending application Ser. No. 662,910 filed Mar. 1, 1976, assigned to the same assignee as herein, that glass reinforced thermoplastic compositions of a polycarbonate resin and poly (1,4-butylene terephthalate) can be molded to articles having greater resistance to warpage in comparison with glass fiber reinforced poly(1,4-butylene terephthalate) resins. It is further disclosed in co-pending application Ser. No. 753,861 filed Dec. 23, 1976, assigned to the same assignee as herein, that zinc stearate when added to polyester polyblends elevates notched Izod impact strength, while maintaining unnotched impact strength, flexural strength and tensile strength and dramatically reduces sample-to-sample variability in elongation. Also it is disclosed in co-pending application Ser. No. 753,863, filed Dec. 23, 1976, and assigned to the same assignee as herein, that glass fibers in combination with a mineral filler provide moled articles with reduced warpage. In addition, it is disclosed in co-pending application Ser. No. 747,635, filed Dec. 6, 1976, assigned to the same assignee as herein, that compositions comprising poly(butylene terephthalate), poly(ethylene terephthalate), a polycarbonate and glass fiber have improved resistance to warpage. It is disclosed in co-pending application Ser. No. 778,945, filed Mar. 18, 1977 that blends of a poly(1,4-butylene terephthalate) resin and a polycarbonate resin reinforced with fibrous glass, when admixed with a small amount of zinc stearate possess even less inherent warpage in the moled article and good moldability when compared with compositions of glass fiber reinforced poly(1,4-butylene terephthalate).

It has now been discovered that flame-retarded, reinforced molded compositions of high molecular weight linear polyester resin, like poly(1,4-butylene terephthalate), possesses very little inherent warpage in the molded article, if a warp resisting amount of polyphenylene sulfide powder is added to the molding composition. The improved resistance to warpage is achieved without any appreciable decrease in other mechanical properties, such as notched Izod impact strength, tensile strength, modulus and flexural strength.

DESCRIPTION OF THE INVENTION

According to this invention, there are provided flame-retarded reinforced thermoplastic compositions having increased resistance to warpage in comparison with other flame-retarded, reinforced polyester compositions, useful for molding, e.g., injection molding, compression molding, transfer molding, and the like, the composition comprising:
 (a) a high molecular weight linear polyester resin;
 (b) a warp resisting amount of polyphenylene sulfide powder;
 (c) a flame-retarding amount of a flame-retardant;
 (d) glass reinforcement; and
 (e) talc The high molecular weight linear polyesters used in the practice of the present invention are polymeric glycol esters of terephthalic acid and isophthalic acids. They are available commerically or can be prepared by known techniques, such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere.

Although the glycol portion of the polyester can contain from two to ten carbon atoms, it is preferred that is contain from two to four carbon atoms in the form of linear methylene chains.

Preferred polyesters will be of the family consisting of high molecular weight, polymeric glycol terephthalates or isophthalates having repeating units of the general formula:

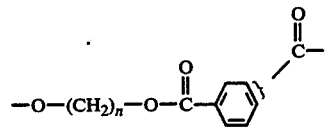

wherein n is a whole number of from two to four, and mixtures of such esters, including copolyesters of terephthalic and isophthalic acids of up to about 30 mole percent isophthalic units.

Expecially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least 0.4 deciliters/gram and, preferably, at least 0.7 deciliters/gram as measured in a 60:40 phenol tetrachlorethane mixture at 30° C. At intrinsic viscosities of at least about 1.1 deciliters/gram, there is a further enhancement in toughness of the present compositions.

Any of the commerically available polyphenylene sulfide powders can be employed in the practice of this invention. A particularly preferred one is known as Ryton V-1 and is sold by Philips Petroleum, Bartlesville, Okla. In general, any warp resisting amount of polyphenylene sulfide powder is useful herein. More particularly these amounts range from about 5 to about 50% preferably 10–20% by weight of the total composition.

The amount of flame-retardant additive used in the polyester composition herein is not critical to the invention, so long as it is present in minor proportion based on said composition — major proportions will detract from physical properties — but at least sufficient to reduce the flammability of the thermoplastic resin. Those skilled in the art are well aware that the amount will vary with the nature of the resin and with the efficiency of the additive. In general, however, the amount of additive will be from 0.5 to 50 parts by weight per 100 parts of resin and an especially preferred range will be from about 8 to 45 parts per 100 parts of resin. Synergists, e.g., antimony oxide, will be used at about 2 to 10 parts by weight per 100 parts of resin.

Any of the conventional flame-retardants, such as decabromodiphenyl ether, which is a preferred flame-retardant herein, can be employed in the compositions of the present invention. In other flame retardants are aromatic carbonate homopolymers having repeating units of the formula:

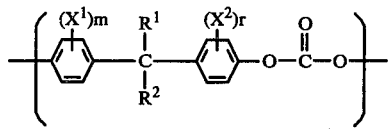

wherein $R^1$ and $R^2$ are hydrogen, (lower) alkyl or phenyl, $X^1$ and $X^2$ are bromo or chloro, or mixtures thereof and m and r are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, above-mentioned. Another preferred flame retardant herein is an aromatic (copoly-) carbonate of 50:50 mole ratio of bisphenol A and tetrabromobisphenol A prepared like Procedure A of U.S. Pat. No. 3,915,926.

Moreover, the flame retardants used herein, such as the aromatic polycarbonate flame regardants and the decabromodiphenyl ether can also be used with a synergist, particularly inorganic or organic antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate, $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are KSb tartrate; Sb caproate; $Sb(OCH_2CH_3)_3$; $Sb(OCH(CH_3)CH_2CH_3)_3$; Sb polymethylene glycolate, triphenyl antimony, and the like. Especially preferred is antimony oxide.

When the polyphenylene sulfide powder is added to the compositions herein employing decabromodiphenyl ether as the flame retardant, improvements in the arc resistance of the molded composition are realized.

The compositions of the present invention also include filamentous glass reinforcement. The filamentous glass is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. the filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles moled from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0001 and 0.125 (one-eighth) inch.

The compositions of this invention also include talc which can have, e.g. a particle size of from less than 325 mesh to about 10 mesh. In general, the combined amount of glass reinforcement and talc used herein is from about 5 to about 50% by weight, preferably from about 30–50% by weight, of the total composition.

The compositions of the present invention are prepared in conventional ways. For example, in one way, the ingredients are put into an extrusion compounder with the polyester resin to produce molding pellets. The polyphenylene sulfide powder and the other ingredients are dispersed in a matrix of the polyester resin in the process. In another procedure, the polyphenylene sulfide powder, the flame-retardant, reinforcement and talc are mixed with the polyester resin by dry blending then either fluxed on a mill and comminuted, or they are extruded and chopped. The polyphenylene sulfide and other ingredients can also be mixed with powdered or granulated polyester resin and directly molded, e.g. by injection or transfer molding techniques. It is always important to thoroughly free the polyester resin from as much water as possible.

In addition, compounding should be carried out to ensure that the residence time in the machine is short; the temperature is carefully controlled, the friction heat is utilized, and an intimate blend of the ingredients is obtained.

Although it is not essential, best results are obtained if the ingredients are pre-compounded, pelletized and then molded. Pre-compounding can be carried out in conventional equipment. For example, after carefully pre-drying the polyester resin, e.g. at 125° for 4 hours, a single screw extruder is fed with a dry blend of all of the ingredients, the screw employed having a long transition and metering section to ensure melting. On the other hand, a twin screw extrusion machine, e.g. a 28 man Werner Pleiderer maching can be fed with resin and additives at the feed point. In another case, a generally suitable maching temperature will be about 400 to 570° F.

The pre-compounded composition can be extruded and cut up into molding compounds such as convention granules, etc., by standard techniques.

The compositions of this invention can be molded in any equipment conventionally used for thermoplastic compositions. For example, with poly(1,4-butyleneterephthalate), good results will be obtained in an injection molding machine, e.g., of the Newbury type with conventional cylinder temperature, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

In order that those skilled in the art may better understand how to practice the present invention, the following examples are given by way of illustration and not by way of limitation.

EXAMPLES 1-6

The following formulations are mechanically blended, then extruded and molded into test pieces in a Van Dorn injection molding machine. The physical properties of the molded pieces are shown in the following Table 1.

above which are within the full intended scope of the invention as defined in the appended claims.

I claim:

1. A flame-retarded, reinforced thermoplastic composition which, after molding, has increased resistance to warpage, the composition comprising, in intimate admixture:
   (a) a high molecular weight linear polyester resin;
   (b) a warp resisting amount of polyphenylene sulfide powder;
   (c) a flame-retarding amount of a flame-retardant;
   (d) reinforcing fibrous glass; and
   (e) talc.

2. A composition as defined in claim 1 wherein component (a) is a poly(1,4-butylene terephthlate) resin.

3. A composition as defined in claim 1 wherein component (a) has an intrinsic viscosity of at least about 0.4 deciliters per gram when measured in a solution in 60:40 mixture of phenol and tetrachloroethane at 30° C.

4. A composition as defined in claim 1 wherein said flame-retardant is decabromodiphenyl ether.

5. A composition as defined in claim 1 wherein said flame-retardant is an aromatic (copoly-) carbonate of 50:50 mole ratio of bisphenol A and tetrabromobisphenol A.

6. A composition as defined in claim 1 wherein component (b) comprises from about 10–20% by weight of the total composition, and the combined amount of components (d) and (e) is from about 30–50% by weight of the total composition.

7. A composition as defined in claim 4 wherein the flame-retardant includes a synergistic amount of anti- Table 1

| Example | 1* | 2* | 3 | 4 | 5 | 6 |
|---|---|---|---|---|---|---|
| Ingredients (parts by weight) | | | | | | |
| poly(1,4-butylene terephthate) (intrinsic viscosity of about 0.9) | 44.8 | 44.8 | 29.8 | 29.8 | 30.6 | 25.6 |
| decabromodiphenyl ether | 6.0 | 6.0 | 6.0 | 6.0 | — | — |
| aromatic (copoly-) carbonate of 50:50 mole ratio of bisphenol A and tetrabromobisphenol A | — | — | — | — | 10.2 | 10.2 |
| antimony oxide | 4.0 | 4.0 | 4.0 | 4.0 | 4.0 | 4.0 |
| fibrous glass | 20.0 | 5.0 | 20.0 | 5.0 | 20.0 | 20.0 |
| talc | 25.0 | 40.0 | 25.0 | 40.0 | 25.0 | 25.0 |
| Inganox 1093[1] | 0.15 | 0.15 | 0.15 | 0.15 | 0.15 | 0.15 |
| Ferro 904[2] | 0.05 | 0.05 | 0.05 | 0.05 | 0.05 | 0.05 |
| polyphenylene sulfide powder[3] | — | — | 15 | 15 | 10.0 | 15.0 |
| Properties | | | | | | |
| Heat distortion (° F) 264 Psi | 385 | 350 | 404 | 378 | 365 | 371 |
| Warpage R.T. (on 4 in. ×1/16"disc.) (mm) | 7 | 0 | 1 | 0 | <1 | <1 |
| Warpage after 30 minutes at 350° F (mm) | 17 | 2 | 11 | 1.5 | 14 | 4 |
| Notched Izod Impact (ft. lbs/in.) | 0.8 | 0.5 | 0.8 | 0.4 | 0.8 | 0.8 |
| Unnotched Izod Impact (ft. lbs./in.) | 5.0 | 3.6 | 3.7 | 2.9 | 5.2 | 4.0 |
| Tensile strength,(psi) | 11,174 | 8,525 | 12,608 | 7,475 | 13,286 | 14,054 |
| Arc resistance (seconds) | 125 | 138 | 166 | 178 | 125 | 125 |
| UL Bul 94 | V-0 | V-0 | V-0 | V-0 | V-0 | V-0 |

*control
[1](tetrakis(3-(3',5'-di-t-butyl-4-hydroxy phenyl propronyl methyl)methane (Ciba-Geigy)
[2](diphenyl decylphosphite)
[3]Ryton V-1 (Philips Petroleum, Bartlesville, Oklahoma)

The examples demonstrate the improved warp resistance and/or improved arc resistance of the compositions of this invention in comparison to the control compositions which are outside the scope of the present invention.

Obviously, other modifications and variations of the present invention are possible in the light of the above teachings. It is therefore, to be understood that changes may be made in the particular embodiments described mony oxide.

8. A flame-retarded, reinforced thermoplastic composition which, after molding, has increased resistance to warpage, the composition comprising, in intimate admixture:
   (a) a poly(1,4-butylene terephthlate) resin having an intrinsic viscosity of at least 0.4 deciliter per gram when measured in solution in a 60:40 mixture of phenol and tetrachlorethane at 30° C.;

(b) polyphenylene sulfide powder in an amount of from about 10–20% by weight of the total composition;
(c) from about 5–15% by weight of the total composition of a flame-retardant selected from the group consisting of decabromodiphenyl ether and an aromatic (copoly-) carbonate of 50:50 mole ratio of bisphenol A and tetratromobisphenol A;
(d) fibrous glass reinforcement; and
(e) talc, wherein the combined amount of components (d) and (e) is from about 30–50% by weight of the total composition.

9. A composition as defined in claim 8 wherein the flame-retardant includes a synergistic amount of antimony oxide.

10. A flame-retarded, reinforced thermoplastic composition which, after molding, has increased resistance to warpage and increased electrical arc resistance, the composition comprising, in intimate admixture:
(a) a poly(1,4-butylene terephthlate) resin having an intrinsic viscosity of at least 0.4 deciliter per gram when measured in solution in a 60:40 mixture of phenol and tetrachloroethane at 30° C.;
(b) polyphenylene sulfide powder in an amount of from about 10–20% by weight of the total composition;
(c) a flame-retarding amount of a synergistic mixture of decabromodiphenyl ether and antimony oxide;
(d) fibrous glass reinforcement; and
(e) talc, wherein the combined amount of components (d) and (e) is from about 30–50% by weight of the total composition.

* * * * *